United States Patent [19]

Ide et al.

[11] 3,944,630

[45] Mar. 16, 1976

[54] PROCESS FOR PREPARING AN IMPACT RESISTANT THERMOPLASTIC GRAFT COPOLYMER COMPOSITION

[75] Inventors: Fumio Ide; Kazuo Kishida; Seiji Deguchi; Masahiro Kaneda, all of Otake, Japan

[73] Assignee: Mitsubishi Rayon Co., Ltd., Tokyo, Japan

[22] Filed: Aug. 27, 1974

[21] Appl. No.: 500,925

[30] Foreign Application Priority Data

Aug. 30, 1973 Japan................................ 48-96592
Mar. 12, 1974 Japan................................ 49-28356

[52] U.S. Cl............. 260/879; 260/880 R; 260/881; 260/885
[51] Int. Cl. ... C08f 19/06; C08f 19/08; C08f 19/10
[58] Field of Search......... 260/879, 880 R, 881, 885

[56] References Cited
UNITED STATES PATENTS 3,825,621   7/1974   Ford............................... 260/878 R

*Primary Examiner*—William F. Hamrock
*Attorney, Agent, or Firm*—Oblon, Fisher, Spivak, McClelland & Maier

[57] ABSTRACT

An impact resistant plastic graft copolymer composition is prepared by 1. agglomerating 100 parts by weight in terms of the solids content of a synthetic rubber latex (A) containing small-sized rubber particles by adding 0.1 – 5 parts by weight, in terms of the solids content of a carboxylic acid containing copolymer latex (B) having a pH of at least 4, said copolymer latex being prepared by polymerizing a mixture of monomers comprising 5 – 20% by weight of at least one monomer selected from the group consisting of acrylic acid, methacrylic acid, itaconic acid and crotonic acid and 95–80% by weight of alkyl acrylate having 1 to 12 carbon atoms in the alkyl group, in the presence of at least one anionic emulsifier, and adjusting the pH of the mixed latexes (A) and (B) to not less than 6;
2. stabilizing the agglomerated latex with at least one nonionic emulsifier, and
3. grafting 93–30 parts by weight of a monomer or mixture of monomers, which is capable of producing a glassy thermoplastic polymer having a glass transition temperature of not less than 50°C in the presence of or onto 7–70 parts by weight in terms of solids content of the agglomerated and stabilized synthetic rubber latex.

15 Claims, No Drawings

PROCESS FOR PREPARING AN IMPACT RESISTANT THERMOPLASTIC GRAFT COPOLYMER COMPOSITION

BACKGROUND OF THE INVENTION

1. Field of the Invention

The present invention relates to a novel process for producing a high impact resistant thermoplastic graft copolymer composition. This graft copolymer can also be blended with a vinyl chloride polymer to thereby provide a composition having a high impact resistance.

2. Description of the Prior Art

It is well known that rigid and brittle thermoplastic resins such as, for example, polystyrene, polymethyl methacrylate, styrene-acrylonitrile copolymers, polyvinyl chloride or the like can be incorporated with a rubber component to obtain thermoplastic resin compositions having high impact resistance. Such thermoplastic resin compositions include ABS resins, high impact polystyrene resins and the like.

It is possible to obtain copolymer compositions having high impact resistance by polymerizing styrene, acrylonitrile, methyl methacrylate or the like in the presence of a rubber latex prepared by emulsion polymerization. However, it is well recognized that the impact resistance and processing properties of the resultant compositions greatly depend on the particle size of the starting rubber latex, and that the impact resistance and the processing properties are improved as the rubber particle size increases. Therefore, rubber components having large-sized particles are preferably employed in the preparation of high impact resistant resins such as ABS resins or the like. However, the particle size of the rubber latex prepared by the conventional emulsion polymerization techniques is generally in the range of approximately 0.04 to approximately 0.15 micron. Accordingly, various methods for agglomerating rubber particles present in synthetic rubber latexes have been heretofore proposed. The term "particle size" as used in this specification means average diameter of the particles.

The methods for agglomerating rubber particles are classified into two main types; one in which rubber particles are agglomerated during the polymerization step and the other in which rubber particles are agglomerated by treating the small-sized rubber particles after the polymerization step. The most serious defect of the type of method in which rubber particles are agglomerated during the polymeriation step is that an extremely long polymerization time is required to complete the polymerization. For instance, in order to obtain a rubber latex containing rubber particles having a particle size of approximately 0.3 micron, it is necessary to continue the polymerization reaction for 48 to 100 hours. In addition, in this method the largest rubber particle size obtainable is at most approximately 0.4 micron and large amounts of macro-agglomerates or coagulum are generally formed with continued polymerization. Further, in the case where the rubber latex having large amounts of coagulum is used for preparing the desired resin composition, large amounts of coagulum are also formed in the graft polymerization step.

On the other hand, the other of method in which rubber particles are agglomerated by treating smallsized rubber particles after the polymerization step can agglomerate the small-sized rubber particles in a relatively short time. Examples of this method are: the treatment of a rubber latex with an acid, a metallic salt, an ammoniumsoap, a particular solvent or a high molecular colloidally active chemical; a freezing and thawing technique, and; a method for treating a rubber latex under high pressure or the like. However, this type of method is disadvantageous in that special apparatuses or additives are required to agglomerate rubber latexes and to produce high impact resistant resins. In addition, in the case wherein the rubber latex is agglomerated by addition of an acid or a metallic salt, special apparatus is not required but the agglomerated particle size of the latex is greatly influenced by the concentration of the acid or the salt to be added, the rate of its addition and the agitating condition of the latex system. This is because when an acid or a slat is used, the particles which are agglomerated are naturally agglomerated by partial destruction of the rubber latex emulsion. Accordingly, it is generally impossible in this method to agglomerate the rubber particles to a size of more than 0.3 micron without the formation of macro-agglomerates or coagulum. In addition, an acid or a salt is used in the form of an aqueous solution of a low concentration, so that the solid concentration of the rubber latex is considerably lowered and the production rate is decreased.

SUMMARY OF THE INVENTION

The objects of the present invention are to provide a process for agglomerating rubber particles contained in a rubber latex. Another object of the present invention is to provide a process for preparing a thermoplastic resin composition having a high impact resistance rapidly and economically.

Other objects and advantages of the present invention will be apparent from the following description.

In accordance with the present invention, there is provided a process for the preparation of an impact resistant thermoplastic graft copolymer composition starting from a small particle sized synthetic rubber latex comprising the steps of:

1. agglomerating 100 parts by weight in terms of the solid content of synthetic rubber latex (A) containing small-sized rubber particles by the addition of 0.1–5 parts by weight in terms of the solid content of a carboxylic acid containing copolymer latex (B) having a pH of at least 4, said copolymer latex being prepared by polymerizing a mixture of monomers comprising 5–20% by weight of at least one monomer selected from the group of acrylic acid, methacrylic acid, itaconic acid and crotonic acid and 95–80% by weight of alkyl acrylates having 1 to 12 carbon atoms in the alkyl group in the presence of at least one anionic emulsifier, and adjusting the pH of the mixed latexes (A) and (B) to not less than 6;

2. stabilizing the agglomerated latex with at least one nonionic emulsifier, and;

3. graft polymerizing 93–30 weight parts of a monomer or mixture of monomers, which is capable of producing a glassy thermoplastic polymer having a glass transition temperature of not less than 50° C in the presence of or onto 7–70 parts by weight in terms of solid content of the agglomerated and stabilized synthetic rubber latex.

DESCRIPTION OF THE PREFERRED EMBODIMENTS

The synthetic rubber components (A) used in the present invention include polybutadiene; comolymers of at least 50% by weight of 1,3-butadiene; for example, butadiene-monoethylenically unsaturated aromatic compound copolymer such as butadiene-styrene copolymer, butadiene-α-methyl styrene copolymer or the like; butadiene-unsaturated nitrile compound copolymers such as butadiene-acrylonitrile copolymer butadiene-methacrylonitrile copolymer or the like; butadiene-acrylate copolymers such as butadiene-methyl acrylate copolymer, butadiene-n-butyl acrylate copolymer or the like; butadiene-methacrylate copolymer such as butadiene-ethyl methacrylate copolymer; a terpolymer or multi-polymer containing at least 50% by weight of 1,3-butadiene, polychloroprene, chloroprene copolymer, and a homopolymer or copolymer of at least 50% by weight of alkyl acrylate having 1 to 12 carbon atoms in the alkyl group. These rubbers can be easily obtained by conventional emulsion polymerization techniques. Any conventional emulsion polymerization initiators and emulsifiers can be used in the preparation of the rubbers. The rubber particles contained in the rubber latexes thus obtained generally have a particle size of approximately 0.04 – 0.15 micron. Of course, rubber particles having a particle size of 0.15 – 0.2 micron can be used in the present process. However, this is not economical because a prolonged time is required to produce the rubber particles having a particle size of 0.15 – 0.2 micron.

The carboxylic acid containing copolymer (B) (for brevity's sake, the copolymer latex is referred to as "C.A. latex" hereinafter) continuing at least one monomer selected from the group of acrylic acid, methacrylic acid, itaconic acid and crotonic acid is used to agglomerate the synthetic rubber latex. The carboxylic acid containing copolymer should be used in the form of latex and should also contain both the carboxylic acid(s) and the alkyl acrylate(s).

Suitable alkyl acrylates containing the carboxylic acid containing copolymer include those having 1 to 12 carbon atoms in the alkyl group such as, for example, methyl acrylate, ethyl acrylate, propyl acrylate, butyl acrylate, octyl acrylate, 2-ethylhexyl acrylate, lauryl acrylate and the like. Two or more of these alkyl acrylates can be also used in combination, and it is also possible to substitute a portion of the alkyl acrylate(s) with one or more copolymerizable monomers, such as, for example, alkyl methacrylate, styrene, acrylonitrile, butadiene or the like up to 50% of the acrylate(s). However, the copolymer containing alkyl methacrylate, styrene, acrylonitrile or the like instead of the alkyl acrylate cannot increase the rubber particle size.

Some acid group-containing monomers other than those specified in the present invention, such as, for example, cinnamic acid, maleic anhydride, butenetricarboxylic acid and the like exhibit a slight agglomerating effect, but they are of no practical use.

Suitable emulsifiers used in the agglomeration of the rubber latex with the C.A. latex of the present invention include anionic surface active agents such as, for example, the sodium salts of fatty acids, the potassium salts of fatty acids, sodium alkylbenzenesulfonates, sodium rosinate, phenylethoxysulfate and the like. A suitable acidic emulsifier such as sodium alkylsulfosuccinate or polyoxyethylene phosphate can be also employed if it is combined with, for example, a salt of fatty acid so that the pH of the emulsion polymerization is maintained at a level of 4 or more. Although it is possible to prepare a C.A. latex even by using a nonionic surface active agent, most of the latexes thus obtained have no substantial agglomerating effect. However, nonionic surface active agents can be used in combination with the above-mentioned anionic surface active agent in the present invention.

The pH of the C.A. latex prepared by emulsion polymerization should be not less than 4. In the case of a C.A. latex prepared by emulsion polymerization at a pH less than 4 or a C.A. latex prepared in the form of an aqueous or organic solution, the C.A. latex has no substantial agglomerating effect. Agglomeration of the base synthetic rubber particles can be accomplished only by mixing the rubber latex with the C.A. latex at a pH of not less than 6 and preferably at a pH within the range of 7 to 13. When the pH of the mixture is less than 6, effective agglomeration of the base rubber cannot be obtained. In contrast, when the pH of the mixture is more than 13, the agglomerated latex becomes unstable.

When the present invention's base rubber latex to be agglomerated by the C.A. latex having a pH of not less than 4, has a pH such that the pH after mixing the two above latexes tobether is 6 or more, the base rubber particles can be easily agglomerated just by mixing the above two latexes together with stirring at ambient temperature. On the other hand, when the base rubber latex to be agglomerated has a pH such that the pH after mixing the above two latexes together is less than 6, the agglomeration process of the present invention should be conducted with the addition of an alkali solution such as potassium hydroxide or the like so that the pH of the latex in the mixture is at least 6 or more. In one embodiment of this case, the alkali solution is added to the base rubber latex prior to mixing with the C.A. latex to increase the pH of the rubber latex to the extent that the pH after mixing both latexes together is 6 or more. In another embodiment of the present invention, the alkali solution is simultaneously or successively added to the mixed latex of the base latex and the C.A. latex to the extent that the pH of the mixed latex is 6 or more.

The amount of the C.A. latex added to the base synthetic rubber latex (A) is in the range from 0.1 to 5 parts by weight, preferably 0.5 to 3 parts by weight, in terms of the solid content based on 100 parts by weight of the base synthetic rubber (A). When the amount of the C.A. latex added is less than 0.1 part by weight, the resulting latex has little substantial agglomerating effect and is of no practical use. When the amount of the C.A. latex added is more than 5 parts by weight, although a greater agglomerating effect can be obtained, it is not desirable to use the C.A. latex in such amounts because the composition of the base rubber is changed and because it is not economical. In general, after completion of the C.A. latex addition the resulting latex is stirred for from 30 minutes to 2 hours.

After completion of the agglomeration step, the agglomerated rubber latex is stabilized prior to graft copolymerization. This is because, where the agglomerated rubber latex is directly graft polymerized using known techniques of graft polymerization in emulsion, the formation of macro-agglomerates cannot be avoided in the course of the graft copolymerization and the macro-agglomerates continue to grow, finally making the latex unstable. This phenomenon is especially noteworthy when the rubber content in the graft copolymer produced is low and when acrylonitrile or methyl methacrylate is used as a graft monomer.

It has now been found that nonionic emulsifiers have a remarkable effect in stabilizing the base rubber (A) latex (A) when it is added to the agglomerated latex in an amount of 0.1 – 5% by weight based on the weight of the dry rubber to be stabilized. When the amount exceeds the upper limit, the graft copolymer latex is difficult to coagulate and the heat stability of the copolymer product is detracted. Suitable nonionic emulsifier used in the present invention include nonionic surface active agents, for example, polyoxyethylene alkyl ether such as polyoxyethylene oleyl ether, polyoxyethylene lauryl ether or the like, polyoxyethylene alkyl phenol ether such as polyoxyethylene nonylphenol ether, polyoxyethylene octylphenol ether or the like, or ester of polyoxyethylene and a fatty acid, such as polyoxyethylene mono laurate, polyoxyethylene monostearate or the like. Of these emulsifiers, the emulsifiers having higher H.L.B. values are more preferably used because they exert a good stabilizing effect. The emulsifiers may be used alone or in combination. In addition, they may be used in combination with conventional anionic emulsifiers. However, anionic emulsifiers such as, for example, salts of fatty acid, disproportionated rosin soap, sodium naphthalene sulphonic acid-formaldehyde reaction product or the like, which are generally used in the preparation of graft copolymers having a high impact strength have little stabilizing effect on the agglomerated base rubber latex. Accordingly the anionic emulsifier cannot be used alone in the present invention. Conversely cationic emulsifiers, make the latex unstable.

After completion of the stabilization step, a monomer or monomer mixture, which is capable of producing a glassy thermoplastic polymer having a glass transition temperature of not less than 50° C is graft polymerized in the presence of or onto the agglomerated and stabilized synthetic rubber latex using conventional techniques of graft polymerization in an emulsion to thereby produce a directing graft copolymer. By the term "graft polymerization" used herein is meant a polymerization process wherein the monomer(s) is polymerized in the presence of a rubber latex. Accordingly, the term "graft copolymer" used herein does not mean only the polymer of a graft monomer chemically bonded onto the rubber polymer body, but also means generically all polymers which are obtained by polymerizing the graft monomer(s) in the presence of the rubber latex.

The monomer(s) used in the present graft polymerization step is one of those which is capable of producing a glassy thermoplastic polymer having a glass transition temperature of not less than 50° C and includes, for example, styrene, methyl methacrylate, acrylonitrile and mixtures thereof, and a mixture of 70% by weight or more of at least one monomer selected from the group of styrene, methyl methacrylate and acrylonitrile and 30% by weight or less of at least one copolymerizable mixture containing the group $CH_2 = C<$. Monomers processing the $CH_2 = C<$ group include, for example, unsaturated aromatic compounds such as vinyl toluene and $\alpha$-methyl styrene; unsaturated nitrile compounds such as methacrylonitrile; alkyl methacrylates such as ethyl methacrylate, alkyl acrylate such as ethyl acrylate and n-butyl acrylate, and the like. When a monomer which produces a polymer having a glass transition temperature less than 50° C is used in the present graft polymerization step, the graft copolymer produced becomes too soft by the incorporation of the rubber component therein and is inferior in the characteristics of the resin for the production of various shaped articles.

In the practice of the present graft polymerization step, the grafting monomer(s) can be added to the base rubber latex all at once, adding the monomer(s) two or more times, adding continuously, or adding plural monomers step by step to polymerize the monomers successively. When the present graft polymerization in the emulsion is conducted, the type of emulsifiers and polymerization initiators used are not limited but may be selected from the conventional emulsifiers and initiators used in the known techniques of graft polymerization in an emulsion. The amounts of the emulsifier and initiator used in the present graft polymerization are also not limited.

The rubber content in the present graft copolymer is in the range from 7 to 70% by weight based on the total graft copolymer composition. If the rubber content in the graft copolymer is less than 7% by weight, the impact strength of the graft copolymer produced is low and, therefore, it is of no practical use. In contrast, if the rubber content exceeds 70% by weight, the graft copolymer is inferior in processing or molding properties and if the graft copolyer is blended with other thermoplastic resins, a composition having both a high impact strength and a good stiffness cannot be obtained.

When the rubber content is within the range of 7 – 40% by weight, the graft copolymer may be preferably used alone as a high impact resistant resin. When the rubber content is within the range of 40 – 70% by weight, the graft copolymer may be compression molded alone into shaped articles having a high impact resistance, but it may be preferably blended with other thermoplastic resins, such as, for example, polyvinyl chloride resin, styrene or derivatives thereof, resins, methyl methacrylate resin, or the like.

To the graft copolymer obtained according to the present invention, conventional anti-oxidants, lubricants, coloring agents, fillers, and the like, can be preferably added.

The process for preparing the graft copolymer composition of the invention has the following advantages in comparison with the conventional processes.

1. The entire process from the polymerization of the base rubber to the preparation of the desired graft copolymer composition can be conducted successively and economically within a very short time.
2. No special apparatus other than polymerization apparatuses is required in the present process.
3. It is not necessary to add any additional additives or stabilizing agent to the rubber agglomerating step and, therefore, the heat stability of the graft copolymer composition produced in the present process is good and the graft composition can be economically produced.
4. Very few macro-agglomerates or coagulum are formed during the present agglomerating step and the present graft polymerization step.
5. The rubber latex containing extremely large-sized rubber particles, for example, a particle size of 0.4 – 1.0 micron can be easily obtained in the present agglomerating step, so that a graft copolymer composition having an extremely high impact resistance can be obtained.

The invention will be further illustrated by, but is by no means limited to, the following Examples, in which all parts and percentages are by weight unless otherwise specified.

EXAMPLE 1

Synthesis of base rubber latex (A-1):

| | |
|---|---|
| 1,3-butadiene | 10 kg |
| t-dodecyl mercaptan | 40 g |
| potassium oleate | 150 g |
| disproportionated rosin soap | 150 g |
| diisopropylbenzene hydroperoxide | 20 g |
| ferrous sulphate | 3 g |
| sodium pyrophosphate | 40 g |
| sodium chloride | 20 g |
| dextrose | 30 g |
| deionized water | 20 kg |

A base rubber latex (A-1) was prepared by polymerizing the above recipe at a temperature of approximately 55° C for 8 hours in a 200 l autoclave. The conversion of the polymerization reaction was 97%. Thus, a base rubber latex having a pH of 8.4 and an average particle size of 0.07 micron was obtained.

Synthesis of C. A. latex (B-1):

| | parts |
|---|---|
| n-butyl acrylate | 85 |
| methacrylic acid | 15 |
| potassium oleate | 2 |
| sodium dioctylsulfosuccinate | 1 |
| cumene hydroperoxide | 0.4 |
| sodium formaldehydesulfoxylate | 0.3 |
| deionized water | 200 |

A C.A. latex (B-1) was prepared by polymerizing the above recipe at a temperature of approximately 70° C for 4 hours in a glass autoclave. The conversion was 98%, and a latex having a pH of 5.6 was obtained.

PREPARATION OF LARGE PARTICLE SIZE LATEX

After evaporating the residual butadiene contained in the 200 l autoclave in which the rubber latex (A-1) was prepared, 97 g (dry) of the C.A. latex (B-1) was charged with stirring to the autoclave containing 9.7 kg of polybutadiene over a period of approximately 5 seconds at a temperature of approximately 20° C. The pH of the resulting latex was 7.1. A portion of the latex thus obtained was sampled from the autoclave and treated with osmium tetroxide, the size of the particles contained in the latex was measured by an electron microscope. The average particle size of the latex was 0.32 micron.

Thirty minutes after completion of the C.A. latex addition, the autoclave containing the agglomerated rubber latex was replaced with nitrogen, and 194 g of polyoxyethylene lauryl ether was added to the autoclave and then a graft polymerization was conducted.

Preparation of Graft Polymer

| | |
|---|---|
| agglomerated polybutadiene (dry) | 9.7 kg |
| styrene | 27.16 kg |
| acrylonitrile | 11.64 kg |
| t-dodecyl mercaptan | 0.25 kg |
| cumene hydroperoxide | 0.1 kg |

-continued

Preparation of Graft Polymer

| | |
|---|---|
| ferrous sulphate | 0.003 kg |
| sodium pyrophosphate | 0.2 kg |
| dextrose | 0.35 kg |
| disproportionated rosin soap | 1.16 kg |
| deionized water (total) | 100 kg |

A graft copolymer latex was prepared by polymerizing the above recipe at a temperature of approximately 60° C for 3 hours to substantially complete the polymerization.

The conversion was 97%. The latex was then filtered through a 100 mesh stainless steel sieve to determine the degree of the coagulum formation. The content of the coagulum in the grafted latex was quite low and was 0.2%. The total time required to obtain the graft polymer from the butadiene monomer was only 15 hours.

To the graft rubber latex so obtained, 200 g of butylated hydroxytoluene and 50 g of dilauryl thio dipropionate were added as antioxidants, and the resulting latex was coagulated by adding thereto a 5% aqueous sulfuric acid solution, followed by washing the coagulated polymer with water and drying it. The dried graft copolymer was selletized at a temperature of approximately 200° C by an extruder having an inner diameter of 25 mm. A specimen for testing Izod impact strength was prepared by injection molding at a temperature of 200° C, and Izod the impact strength of the specimen was determined according to ASTM method D-256-56 and the result was 47 kg-cm/cm$^2$. The Melt Index of the graft copolymer which was determined at 200° C/5 kg was 2.1 g/10 min.

Following the same procedure mentioned above, except that the base rubber latex (A-1) was not agglomerated, a control graft copolymer was prepared. The resulting graft copolymer was tested in the same manner as that mentioned above. The Izod impact strength was 8.3 kg-cm/cm$^2$ and the Melt Index was 0.6 g/10 min, both of which were inferior of the results obtained in the graft copolymer using the agglomerated rubber. Further, a control graft polymer was prepared using the same procedure as mentioned above except that the base rubber latex (A-1) was agglomerated by using a 0.5 % aqueous sulfuric acid solution (one of the conventional agglomeration techniques). However, a large amount of macro-agglomerates, that is, 9.2% of macroagglomerates was formed in the agglomeration step and in the graft polymerization step, and the Izod impact strength and the Melt Index of the resulting graft copolymer were 23.6 kg-cm/cm$^2$ and 1.2 g/10 min, respectively.

As is apparent from the results shown above, in accordance with the present invention, a graft copolymer having excellent physical properties was obtained in a very short time, and the formation of macro-agglomerates did not occur.

EXAMPLE 2

The C. A. latexes (B-2 - B-7) shown in Table 1 were prepared as agglomerating agents in a procedure similar to that in Example 1 and the copolymer latexes (BF-1 - BF-4) shown in Table 1 were also prepared as comparative examples.

Table 1

| Run No. | Emulsifier | Catalyst | Copolymer Composition | pH of the Latex | Note |
|---|---|---|---|---|---|
| B-2 | OK/DOSNa = 2/1 | C.H.P.-R | BA/MAA = 80/20 | 6.0 | this invention |
| B-3 | OK/DOSNa = 2/1 | C.H.P.-R | EA/MAA = 91/9 | 6.7 | this invention |
| B-4 | OK/DOSNa = 2/1 | C.H.P.-R | BA/AA = 80/20 | 5.3 | this invention |
| B-5 | OK/DOSNa = 2/1 | C.H.P.-R | BA/MA/MAA = 60/25/15 | 5.0 | this invention |
| B-6 | OK/DOSNa = 2/1 | K.P.S. | BA/2EHA/MAA = 50/35/15 | 6.3 | this invention |
| B-7 | OK/KOSNa = 2/1 | K.P.S. | BA/MAA = 90/10 | 7.2 | this invention |
| BF-1 | OK/DOSNa = 2/1 | C.H.P.-R | St/MAA = 80/20 | 6.8 | comparative example |
| BF-2 | OK/DOSNa = 2/1 | C.H.P.-R | MMA/MAA = 80/20 | 8.2 | comparative example |
| BF-3 | OK/DOSNa = 2/1 | C.H.P.-R | BA/MAA = 96/4 | 6.5 | comparative example |
| BF-4 | DOSNa | K.P.S. | BA/MAA = 85/15 | 2.1 | comparative example |

(Note) OK: potassium oleate, DOSNa: sodium dioctylsulfosuccinate, C.H.P.: cumene hydroperoxide, R: sodium formaldehyde sulfoxylate, K.P.S.: potassium persulfate, BA: n-butyl acrylate, MAA: methacrylic acid, AA: acrylic acid, MA: methyl acrylate, 2EHA: 2-ethylhexyl acrylate, St: styrene, MMA: methyl methacrylate.

The polybutadiene rubber latexes (A-1) prepared by the same procedure as in Example 1 were agglomerated with the C. A. latexes (B-2 - B-7) and the copolymer latexes (BF-1 - BF-4) in amounts indicated in Table 2 in the same manner as in Example 1. After 2% by weight based on the dry rubber of polyoxyethylene lauryl ether was added to each agglomerated rubber latex to stabilize the latex (in the case of GF-1 through GF-4 in Table 2, 3% by weight based on the amount of rubber of polyoxyethylene lauryl ether were added), graft copolymer latexes were prepared by the same procedure as in Example 1. The graft copolymers thus obtained were tested for their properties and the formation of coagulum. The results are shown in Table 2.

(GF-1 - GF-4) had poorer properties than the properties of the graft copolymers (G-2 - G-7) of the present invention.

The graft copolymers GF-1 and GF-2 were formed by using the copolymer latexes BF-1 and BF-2, respectively, which included no acrylic ester in the copolymer components, and, even if the copolymer latex was used in much larger quantities, the properties of the resulting graft copolymer did not improve at all. This is because such copolymers are not effective for agglomerating the base rubber. The graft copolymer GF-3 was formed by using the copolymer latex BF-3 which contained only 4%, i.e. less than 5%, by weight based on total comonomer of methacrylic acid and, therefore in this case sufficient agglomeration of the base rubber could not be obtained unless the copolymer latex BF-3 was added in much larger quantities. However, it is not desirable to use the latex in such large amounts because the graft copolymer composition is changed. GF-4 was formed by using the copolymer latex BF-4, the composition of which is within the scope of the present invention, but the pH of the mixed latex of the base rubber Table 2

| Run No. | Base rubber | C.A. Latex Number | Percent of C.A. Latex added (solid % based on base rubber) | pH of mixed Latex | Particle diameter (micron) | Amount of Coagulum after graft polymerization | Mechanical properties of graft copolymer | |
|---|---|---|---|---|---|---|---|---|
| | | | | | | | Izod Impact Strength (kg-cm/cm²) | Melt Index *2 (g/10 min) |
| G-2 | A-1 | B-2 | 0.8 | 8.3 | 0.35 | 0.23 | 52.3 | 1.5 |
| G-3 | A-1 | B-3 | 1.0 | 8.2 | 0.40 | 0.33 | 44.2 | 2.5 |
| G-4 | A-1 | B-4 | 1.2 | 8.2 | 0.33 | 0.15 | 46.1 | 1.4 |
| G-5 | A-1 | B-5 | 0.6 | 8.3 | 0.29 | 0.10 | 41.2 | 1.9 |
| G-6 | A-1 | B-6 | 2.0 | 7.9 | 0.44 | 0.28 | 53.4 | 1.8 |
| G-7 | A-1 | B-7 | 2.5 | 8.2 | 0.28 | 0.10 | 39.6 | 1.7 |
| GF-1 *1 | A-1 | BF-1 | 5.0 | 7.7 | 0.09 | 3.26 | 5.7 | 0.3 |
| GF-2 *1 | A-1 | BF-2 | 5.0 | 8.4 | 0.09 | 4.32 | 5.9 | 0.4 |
| GF-3 *1 | A-1 | BF-3 | 3.0 | 8.0 | 0.14 | 3.60 | 7.6 | 0.5 |
| GF-4 *1 | A-1 | BF-4 | 1.0 | 7.5 | 0.19 | 1.0 | 10.3 | 0.4 |

*1: comparative Example
*2: measured at 200°C/5 kg

As is apparent from the results shown in Table 2, in the case where the base rubber latex (A-1) was agglomerated with each C. A. latex (B-2 - B-7) prior to the graft copolymerization, each graft copolymer (G-2 - G-7) had excellent physical properties. On the other hand, in the case where the base rubber latex (A-1) was treated with each copolymer latex (BF-1 - BF-4) prior to the graft copolymerization, each graft copolymer latex and the copolymer latex was low, i.e. pH 2.1, so that the base rubber latex was not agglomerated and the resulting graft copolymer was of no substantial practical use.

EXAMPLE 3

A base polybutadiene latex A-2 having a particle size of 0.09 micron, a gel content of 80%, a swelling degree in toluene of 21.5 and a pH of 9.2 was prepared using the same procedure as in Example 1. A C. A. latex (B-8) having a pH of 5.7 was also prepared by emulsion polymerization of a mixture of 83% by weight of n-butyl acrylate and 17% by weight of methacrylic acid using an emulsifier composed of 50 parts by weight of potassium oleate and 50 parts by weight of sodium dioctylsulfosuccinate in a manner similar to that in Example 1.

The base polybutadiene latex A-2 was agglomerated with varying amounts of the C. A. latex (B-8) as shown in Table 3 and was stabilized by the addition of 3% by weight of polyoxyethylene octylphenol ether. 17 parts (dry) of the agglomerated latex was then graft polymerized with 55 parts by weight of styrene and 28 parts by weight of acrylonitrile using the same procedure as in Example 1. The physical properties of the graft copolymer composition thus obtained are shown in Table 3.

changed by the addition of the copolymer latex. After the completion of the copolymer latex addition the pH of the base rubber latex was raised to 8.1 by the addition of a 1% aqueous sodium hydroxide solution and, thereby, the particle size of the base rubber latex was increased to 0.37 micron. Then, 2.0 parts based on 100 parts of the dry rubber of polyoxyethylene nonyl phenol ether were added to the agglomerated rubber latex to stabilize the latex, followed by graft polymerizing with 200 parts of styrene and 100 parts of acrylonitrile at 70° C, for 4 hours, using 1 part of cumene hydroperoxide and 1 part of sodium formaldehyde sulfoxylate as an initiator in the presence of 1.0 part of potassium oleate and 1.0 part of disproportionated rosin soap. The time required to prepare the graft copolymer was only 10 hours and the amount of the coagulum formed in the graft copolymer latex was only 0.2%.

The graft copolymer so obtained was coagulated, and

Table 3

| Run No. | % addition of latex (B-8) | pH of mixed latex | Particle diameter (micron) | Mechanical properties of graft copolymer | |
|---|---|---|---|---|---|
| | | | | Izod impact strength (kg-cm/cm$^2$) | Melt index*[2] (g/10 min) |
| GF-5*[1] | 0 | 9.2 | 0.09 | 4.2 | 0.17 |
| GF-6*[1] | 0.05 | 9.2 | 0.14 | 10.2 | 0.21 |
| G-8 | 0.1 | 9.2 | 0.24 | 36.2 | 1.1 |
| G-9 | 0.5 | 9.1 | 0.32 | 45.2 | 1.7 |
| G-10 | 1.0 | 8.9 | 0.34 | 49.6 | 2.1 |
| G-11 | 2.0 | 8.8 | 0.38 | 52.6 | 2.2 |
| G-12 | 3.0 | 8.6 | 0.44 | 42.5 | 2.3 |
| G-13 | 5.0 | 8.4 | 0.51 | 39.6 | 2.5 |

*[1]Comparative Example
*[2]Measured at 200°C/5 kg

It will be recognized from Table 3 that the graft copolymer compositions to which 0.1 – 5% by weight of the latex (B-8) was added, i.e., G-8 - G-13, have excellent physical properties. On the other hand, in the case where the amount of the latex (B-8) was added to the base rubber was less than 0.1% by weight, a graft copolymer composition having good physical properties could not be obtained. When the amount of the latex (B-8) added to the base rubber was more than 5% by weight, a graft copolymer having somewhat good physical properties could be obtained, but the viscosity of the polymerization mixture increased during the graft polymerization step, so that the latex thus obtained was unstable. Further, this method is not economical.

EXAMPLE 4

A ployacrylate rubber (A-3) was prepared according to the following description

| Synthesis of A-3 latex | Parts |
|---|---|
| n-butyl acrylate | 95 |
| Styrene | 5 |
| Tetraethylene glycol dimethacrylate | 0.7 |
| Sodium dioctyl sulfosuccinate | 2.0 |
| Potassium persulfate | 0.6 |
| Deionized water | 200 |

The above ingredients were polymerized at 70° C for 5 hours, and an n-butyl acrylate-styrene copolymer rubber latex having a pH of 2.4 was obtained. Into the reaction vessel containing the above rubber latex, 1.5 parts (dry) of a copolymer latex comprising 60% of n-butylacrylate, 25% of ethylacrylate and 15% of methacrylic acid with a pH of 6.1 was added with stirring. The particle size of the base rubber latex was not then was washed and dried. The mechanical properties of the injection moulded samples of the graft copolymer were as follows:

| Izod impact strength | 23.6 kg-cm/cm$^2$ |
| Melt index (at 200°C/5 kg) | 2.6 g/10 min. |

EXAMPLE 5

To 100 parts (dry) of butadiene-styrene rubber latex having a particle size of 0.08 micron, a gel content of 90%, a swelling degree in toluene, of 17 and a pH of 9.0 and comprising 75% of butadiene and 25% of styrene, 2.0 parts of a C.A. latex comprising 85% of n-butyl acrylate and 15% of methacrylic acid and having a pH of 5.4 were added and, thereby, an agglomerated rubber latex having a particle size of 0.35 micron and a pH of 8.4 was obtained.

The agglomerated rubber latex was stabilized by the addition of 1.0% of polyoxyethylene stearyl ether and, then, 35 parts of styrene was graft polymerized onto the stabilized rubber latex using a procedure similar to Example 1. After completion of the graft polymerization, 32 parts of methyl methacrylate was further graft polymerized onto the resultant graft copolymer latex and the graft copolymer (G-15) having a high rubber content was obtained. To the graft copolymer (G-15) latex, 1% of butylated hydroxytoluene and 0.6% of dilauryl thiodipropionate was added and a white powder was obtained upon coagulation, washing and drying of the graft copolymer latex.

100 parts of polyvinyl chloride having a polymerization degree of 700 was blended with 3.0 parts of dibutyl tin maleate, 1.0 part of butyl stearate, 0.3 part of stearyl alcohol and 0.2 part of Hoechst Wax OP (partially saponified montanic acid wax), and then 10 parts and 15 parts of the graft copolymer (G-15) were blended thereto at 165° C. using a mixing roller, respectively. The moulded samples of the compositions had the following high Charpy Impact values.

| Parts of G-15 added | Charpy Impact |
|---|---|
| 10 | 45.6 kg-cm/cm² |
| 15 | 98.7 kg-cm/cm² |

As is shown from the above results, the graft copolymer having a high rubber content prepared in accordance with the present process can be effectively applied to polyvinyl chloride resin as an impact modifier, and it can also be effectively applied to styrene-acrylonitrile copolymer resin.

EXAMPLE 6

A butadiene-styrene copolymer rubber latex having a particle size of 0.10 micron, a gel content of 75%, a swelling degree in toluene of 27 and a pH of 8.8 and comprising 70% of butadiene and 30% styrene was prepared. To 100 parts of the rubber latex 4.0 parts of a C.A. latex comprising 60% of n-butyl acrylate, 20% of methyl methacrylate and 20% of methacrylic acid and having a pH of 6.2 was added and, thereby, the particle size of the rubber latex was agglomerated to 0.75 micron. The pH of the agglomerated rubber latex was 7.9. The agglomerated rubber latex was then stabilized by the addition of 3.5% based on the dry rubber of polyoxyethylene lauryl ether. Four hundred parts of styrene was graft polymerized onto 100 parts (dry) of the agglomerated and stabilized rubber latex. The graft copolymer thus obtained had an Izod Impact Strength of 17.6 kg-cm/cm².

EXAMPLE 7

By using the C.A. latex (B-1) employed in Example 1, various base rubber latexes having a particle size of 0.07 through 0.1 micron shown in Table 4 below were agglomerated, and thereto 2% (based on the dry rubber) of polyoxyethylene oleyl ether was added to stabilize the rubber latex. Twenty parts of the resultant rubber latex were graft polymerized with 80 parts of comonomers listed in Table 4 using 5% (based on the dry base rubber) of disproportionated rosin soap. The Izod Impact Strength of the graft copolymers thus obtained were measured in the same manner as in Example 1 and the results are shown in Table 4.

As is apparent from the results shown in Table 4, in accordance with the present process graft copolymer composition having a high impact resistance can be obtained even if the composition of the base rubber is changed.

EXAMPLE 8

A butadiene-styrene copolymer rubber latex comprising 75% of 1,3-butadiene and 25% of styrene and having a particle size of 0.09 micron, a gel content of 85%, a swelling degree in toluene of 16.0 and a pH of 9.2 was prepared. A copolymer latex comprising 84% of n-butyl acrylate and 16% of methacrylic acid and having a pH of 5.6 was prepared. 0.9 part (dry) of the copolymer latex so obtained was added to 100 parts (dry) of the butadiene-styrene rubber latex to agglomerate the rubber particles. The pH of the resultant mixed latex was 9.0 and the average particle size of the agglomerated latex was 0.28 micron. After 0.5% of polyoxyethylene lauryl ether was added to the agglomerated rubber latex to stabilize the latex, 85 parts of a comonomer mixture comprising 50% styrene, 36% methyl methacrylate and 14% acrylonitrile was graft polymerized onto 15 parts (dry) of the agglomerated rubber latex.

The graft copolymer thus obtained was recovered from the latex using conventional techniques. The physical properties of the moulded samples of the graft copolymer were as follows:

| | |
|---|---|
| Izod Impact Strength | 21.6 kg-cm/cm² |
| Total Light Transmittance | 86.7% |
| Haze Value | 9.6% |

What we claim is:

1. A process for the preparation of an impact resistant thermoplastic graft copolymer composition from a small particle sized synthetic rubber latex, comprising the steps of:

1. agglomerating 100 parts by weight in terms of the solids content of a synthetic rubber latex (A) selected from the group consisting of polybutadiene, copolymers containing at least 50% by weight 1,3-butadiene, butadiene-unsaturated nitrile copolymers, butadiene-acrylate copolymers, butadiene-methacrylate copolymers, terpolymers or multipolymers containing at least 50% by weight 1,3-butadiene, polychloroprene, chloroprene copolymer and a homopolymer or copolymer of at least 50% by weight of alkyl acrylate having 1 to 12 carbon atoms in the alkyl group containing small-sized rubber particles by adding 0.1 – 5 parts by Table 4

| Run No. | Base rubber composition | Base latex pH | % of (B-1) latex added | pH of mixed latex | Particle size (micron) | Graft comonomer composition (%) | Izod impact strength of graft copolymer (kg-cm/cm²) |
|---|---|---|---|---|---|---|---|
| G-16 | Bd/MMA = 80/20 | 9.2 | 1.0 | 9.0 | 0.32 | MMA/St = 80/20 | 24.2 |
| G-17 | Bd/AN = 75/25 | 8.6 | 1.5 | 8.4 | 0.35 | AN/MA = 80/20 | 48.6 |
| G-18 | Bd/St/MMA = 65/20/15 | 9.0 | 2.0 | 8.5 | 0.38 | St/AN = 70/30 | 38.9 |
| G-19 | Bd/EA = 80/20 | 8.0 | 3.5 | 7.5 | 0.48 | St/AN = 68/32 | 41.8 |
| G-20 | BA/MMA = 90/10 | 8.4 | 2.0 | 7.8 | 0.31 | St/AN = 75/25 | 19.6 |
| G-21 | CP/AN = 95/5 | 8.1 | 1.0 | 7.9 | 0.29 | Vc/MA = 90/10 | 30.6 |

Bd: butadiene  
St: styrene  
CP: chloroprene

MMA: methyl methacrylate  
EA: ethyle acrylate  
VC: vinyl chloride

AN: acrylonitrile  
BA: butyl acrylate  
MA: methyl acrylate weight, in terms of the solids content, of a carboxylic acid containing copolymer latex (B) having a pH of at least 4, said copolymer latex being prepared by polymerizing a mixture of monomers comprising 5 – 20% by weight of at least one monomer selected from the group consisting of acrylic acid, methacrylic acid, itaconic acid and crotonic acid and 95 – 80% by weight of alkyl acrylate having 1 to 12 carbon atoms in the alkyl group, in the presence of at least one anionic emulsifier, and adjusting the pH of the mixed latexes (A) and (B) to not less than 6;

2. stabilizing the agglomerated latex with at least one nonionic emulsifier in an amount of 0.1 – 5% by weight of the dry rubber to be stabilized; and 3. grafting 93 – 30 parts by weight of a monomer or mixture of monomers, which is capable of producing a glassy thermoplastic polymer having a glass transition temperature of not less than 50° C in the presence of or onto 7 – 70 parts by weight in terms of solids content of the agglomerated and stabilized synthetic rubber latex.

2. The process as claimed in claim 1, wherein said synthetic rubber latex (A) is a polybutadiene latex.

3. The process as claimed in claim 1, wherein said synthetic rubber latex (A) is a copolymer latex comprising 35 – 50% by weight of butadiene and 15 – 50% by weight of styrene.

4. The process as claimed in claim 1, wherein the pH of the synthetic rubber latex (A) is in the range from 7 to 13.

5. The process as claimed in claim 1, wherein the average particle diameter of the starting synthetic rubber latex (A) is in the range from 0.04 to 0.15 micron.

6. The process as claimed in claim 1, wherein said synthetic rubber latex (A) is a homopolymer or a copolymer of at least 50% by weight of alkyl acrylate having 1 – 12 carbon atoms in the alkyl group.

7. The process as claimed in claim 1, wherein the grafting monomer mixture comprises 85 – 60% by weight of styrene and 15 – 40% by weight of acrylonitrile.

8. The process as claimed in claim 1, wherein said graft copolymer consists essentially of 40–65% by weight of styrene, 10–60% by weight of methyl methacrylate and 0–30% by weight of acrylonitrile grafted onto 40–70% by weight of the agglomerated rubber.

9. The process as claimed in claim 3, wherein the grafting monomer consists essentially of 40 – 70% by weight of styrene, 5 – 60% by weight of methyl methacrylate and 5 – 40% by weight of acrylonitrile.

10. The process as claimed in claim 6, wherein the grafting monomer comprises at least 60% by weight of methyl methacrylate.

11. The process as claimed in claim 1, wherein the grafting monomer comprises at least 60% by weight of acrylonitrile.

12. The process as claimed in claim 1, wherein the carboxylic acid containing copolymer latex (B) is an emulsion polymerized copolymer of 80 – 90 % by weight of n-butyl acrylate and 10 – 20% by weight of methacrylic acid.

13. The process as claimed in claim 1, wherein the pH of the carboxylic acid containing copolymer latex (B) is in the range from 4 to 8.

14. The process as claimed in claim 1, wherein the rubber content of the graft copolymer is in the range from 7 to 40% by weight.

15. The process of claim 1, wherin said nonionic emulsifier is at least one selected from the group consisting of polyoxyethylene alkyl ether, polyoxyethylene alkyl phenol ether and ester of polyoxyethylene with a fatty acid.

* * * * *